United States Patent [19]
Paletta, deceased et al.

[11] Patent Number: 4,767,222

[45] Date of Patent: Aug. 30, 1988

[54] COMPLIANT HYDRODYNAMIC GAS LUBRICATED BEARING

[75] Inventors: Guisuppe Paletta, deceased, late of Birmingham; Angelo D. Paletta, legal representative, Orchard Lake, both of Mich.

[73] Assignee: Williams International Corporation, Walled Lake, Mich.

[21] Appl. No.: 60,494

[22] Filed: Jun. 11, 1987

[51] Int. Cl.[4] .............................................. F16C 25/04
[52] U.S. Cl. ................................................... 384/106
[58] Field of Search ............... 384/106, 103, 104, 105, 384/100

[56] References Cited

U.S. PATENT DOCUMENTS

| | | | |
|---|---|---|---|
| 4,118,079 | 10/1978 | Newman et al. | 384/106 |
| 4,415,280 | 11/1983 | Agrawal | 384/103 |
| 4,415,281 | 11/1983 | Agrawal | 384/106 |
| 4,549,821 | 10/1985 | Kawakami | 384/106 |

*Primary Examiner*—Lenard A. Footland
*Attorney, Agent, or Firm*—Lyman R. Lyon

[57] ABSTRACT

A self-pressurizing compliant hydrodynamic gas bearing includes a resilient support system having a multi-stage spring arrangement for supporting a flexible foil. The compliant and resilient support system enables the bearing to provide greater load capacity under extreme transient loads while accommodating local thermal distortions, shaft misalignment and runout.

2 Claims, 1 Drawing Sheet

COMPLIANT HYDRODYNAMIC GAS LUBRICATED BEARING

BACKGROUND OF THE INVENTION

Compliant hydrodynamic gas bearings are ideally suited to conditions found in high performance machinery subject to extreme conditions of temperature and speed. Such bearings are not subject to the significant operational and durability limitations characteristic of bearings which require liquid lubrication and complex lubricant, support, cooling and sealing systems.

While known compliant hydrodynamic gas bearings are satisfactory in many applications, there is room for improvement in overall load capacity and dynamic stability of the rotor-bearing system at all speeds.

The principal difficulties experienced in known compliant foil bearing systems has been that known bearings exhibit limited foil stiffness resulting in an inability to control oscillatory motions between the movable and stationary members at certain critical bearing speeds. While it is advantageous to minimize the thickness of the foil bearing in order to render it sufficiently compliant to conform to the supported member uniformly under all conditions, such thin foils exhibit a reduced load-bearing capacity.

Another problem relates to oscillation under actual load conditions. The shaft in a high-speed radial bearing tends to orbit about the geometric center of the bearing support and the amplitude of the oscillation is maximized at certain critical speeds. In order to control this oscillation, it is desirable to provide substantial damping in the bearing assembly. This problem is especially critical in the case of small journal bearings in which only limited space is available for the bearing assembly. Proper control or elimination of high-speed instability will permit the bearing to operate to the burst speed of the rotating assembly.

There are two principal types of instability, the first of which is known as "synchronous whirl" and the second of which is known as "half-speed whirl". During relatively low-speed rotation of a shaft, the orbiting motion of the geometric center of the shaft about the geometric center of the bearing support tends to set up centrifugal forces acting on the shaft which cause the shaft to orbit or whirl at a rotatioal speed equal to the rotational speed of the shaft about its own axis. This orbiting or whirling motion is synchronous whirl and occurs at the lowest critical speed of the bearing.

Half-speed whirl is a more serious instability which occurs as the shaft approaches a speed approximately equal to twice its lowest critical speed. At twice critical speed the shaft inherently tends to undergo harmonic vibration at its lowest critical frequency. This harmonic vibration is superimposed upon the synchronous whirl and is stimulated or excited by the load carrying rotating fluid wedge whose average velocity about the shaft now approaches the lowest critical speed. As a result, orbital excursions of the shaft rapidly increase in amplitude. During half-speed whirl the whirl velocity of the shaft approximates the average velocity of the fluid wedge. When this occurs the speed of the fluid wedge relative to the orbiting shaft tends toward zero, causing a loss of fluid film support. Since the shaft is operating at a relatively high speed, contact between the shaft and bearing may cause damage or failure of the bearing.

Compliant foil bearings which accommodate orbital excursions of the shaft while providing a cushioning and dampening effect have been found to greatly reduce whirl instability. However, known bearings do not present a complete solutions to the problems of hydrodynamic bearings since there is till a need for greater load-carrying capacity while providing improved whirl stability. Moreover, there is a need for a bearing which compensates for misalignment between the movable and stationary elements. Additionally, thermal distortion of the movable element due to rapid heating of the surface of the movable element nearest the stationary element while the remainder of the movable element remains relatively cool remains a problem. The temperature gradient imposed tends to distort the uniform surface of the movable element.

SUMMARY OF THE INVENTION

The present invention relates generally to self-pressurizing compliant hydrodynamic gas bearings that support two relatively movable members by a thin fluid film. More particularly, the invention relates to foil-type gas bearings in which means are provided for stiffening the foil to enhance the load-carrying capability of the bearing and to provide dampening and cushioning between the two relatively movable members.

Accordingly, one object of the invention is a new and improved hydrodynamic gas bearing which is capable of operating at high temperatures and rotational velocities while exhibiting improved load carrying capacity and dynamic stability characteristics.

Another object of the invention is a new and improved hydrodynamic gas bearing in which the bearing stiffness and Coulomb damping can be independently controlled.

Another object is a hydrodynamic gas bearing with a greater tolerance of misaligned load conditions.

A further object of this invention is a hydrodynamic gas bearing which does not require high machining accuracy, is simple to manufacture and assemble, can be produced at low cost, and which does not require high precision alignment or maintenance of dimensions during operation.

DETAILED DESCRIPTION OF THE PREFERRED EMBODIMENT OF THE INVENTION

Figure 1:
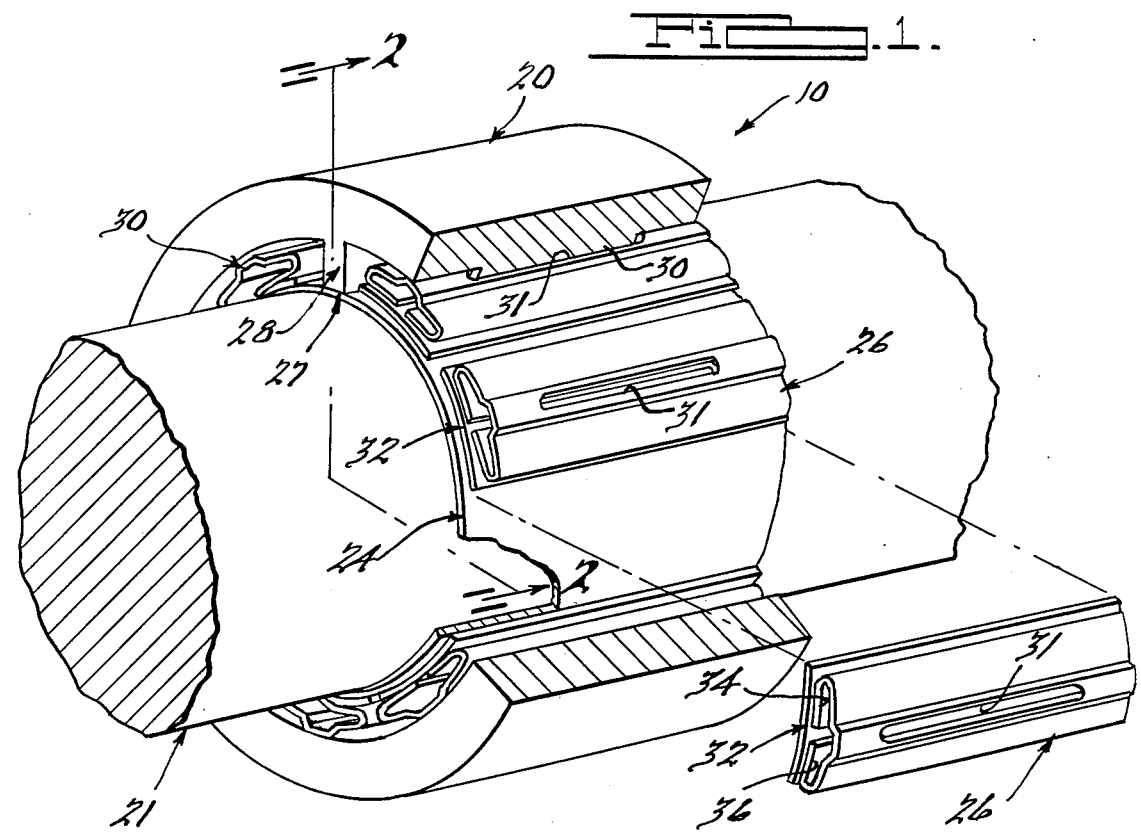
FIG. 1 is a perspective view, partially broken away, of a gas journal bearing made in accordance with the instant invention.
Figure 2:
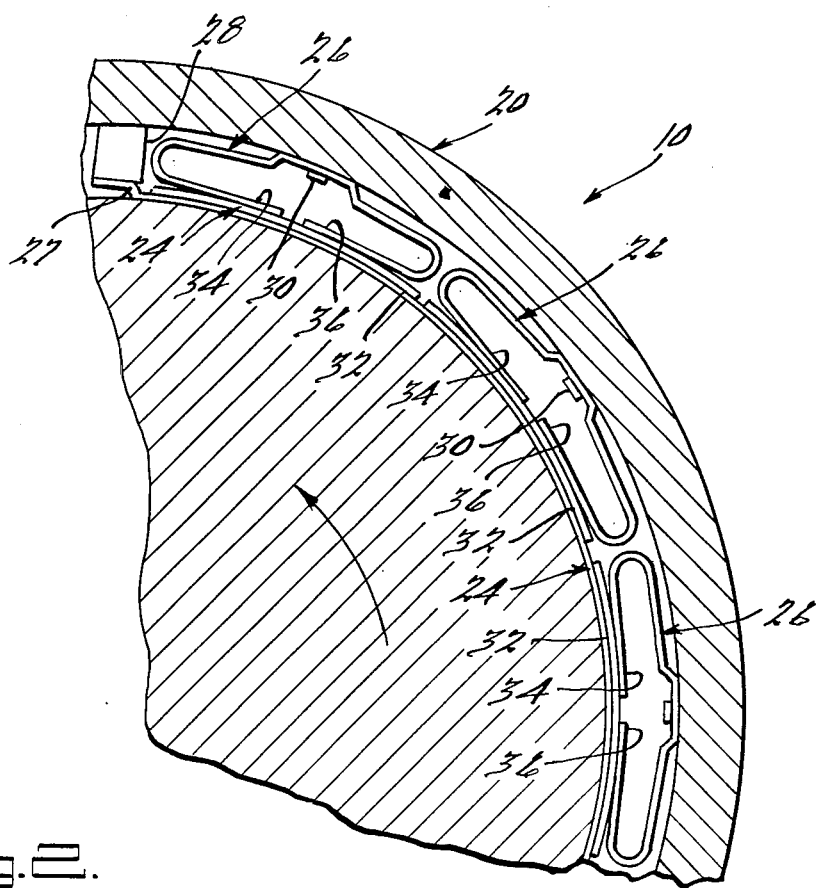
FIG. 2 is a view of one quadrant of the gas journal bearing taken along the line 2—2 of FIG. 1.

Referring to FIG. 1 of the drawings, a compliant hydrodynamic gas bearing 10 in accordance with a preferred and constructed embodiment of the present invention comprises a shaft journal 20 adapted to be disposed about a shaft 21. A flexible compliant foil 24 is supported in radially inwardly spaced relation to the sleeve 20 by multiple resilient spring elements 26. An end portion 27 of the foil 24 is fastened, as by welding, to a spacer block 28 which is attached, as by welding, to the journal 20.

The multiple pad and spring support elements 26 are positioned on the inner wall of the journal 20 by a like plurality of circumferentially spaced locator tabs 30 which are accepted in complementary slots 31 in the spring elements 26.

Each spring element 26 supports an arcuate pad 32 which is attached, as by welding, to either or both free ends 34 and 36 of the spring support 26. The pad 32 on each spring element 26 contacts and radially positions the foil 24. It is to be noted that no attachment is provided between the pads 32 and the mating surface of the foil 24. Each pad 32 has a radius of curvature complementary to the shaft 21 so that the foil 24 conforms thereto.

Thus, each pad 32 on each spring element 26 serves two functions, namely, (a) to provide localized contour stiffness to the foil 24 to prevent unwanted undulations in the hydrodynamic fluid film surface thereof that would decrease the load carrying capacity of the bearing and (b) to provide the primary Coulomb damping action in the bearing under oscillatory loads. This damping occurs between the active surfaces of each pad 32 and the mating surfaces of the foil 24. Since damping is directly related to the coefficient of friction between the foil 24 and pad 32, surface treatment of one or both members can be utilized to fine tune the damping characteristics.

The spring elements 26 along with the pad elements 32 comprise a compliant support system which provides stiffness control for the bearing 10. The support system optimizes (a) the hydrodynamic fluid film and load-carrying capacity thereof, (b) bearing damping capability, (c) the optional provision for staged increase in stiffness with increasing load on the foil 24, (d) additional capability to control distortions along the foil 24 in the axial direction, and (e) the capability of the bearing 10 to withstand misalignment between the foil 24 and the shaft 21.

In operation, rotation of the shaft 21 relative to the foil 24 induces the formation of a boundary layer of gas in a converging wedge-shaped gap between the shaft surface and the bearing surface of the foil 24. The converging wedge-shaped gap is inherently formed in the journal bearing due to unavoidable eccentricities in the system, for example, eccentricity of the shaft axis relative to the journal axis.

The spring elements 26 and their attached pads 32 provide for both radial and longitudinal deflection of the foil 24 in accordance with the pressure profile of the hydrodynamic gas film so as to provide maximum load carrying capacity, to tolerate bearing misalignments and skew loads, and to tolerate axial thermal distortions. Load carrying capacity is further enhanced by the geometry of the spring elements 26 which provide an initial soft layer of support that becomes progressively stiffer in the radial direction.

Under misalignment or skewed load conditions, substantial deflections of one edge of the bearing assembly 10 may occur in a direction parallel the axis of the shaft 21. Lateral deflections in the form of relative misalignment between the shaft 21 and the stationary bearing members are compensated by the spring element 26. The spring constant of the spring elements 26 and the pads 32 provide the means to tailor resistance to lateral deflection of the bearing 10 thereby to tolerate bearing misalignment and skew loads. The clearance space between the shaft 21 and the foil 24 at the two ends of the bearing 10 remains substantially uniform across the journal surface of the shaft 21 within the constraints imposed by the pressure profile of the hydrodynamic gas fluid-film. It also enables the pressure profile across the foil 24 to be relatively uniform since the bearing clearance is relatively uniform, thereby minimizing any reduction in load capcity of the bearing under such conditions. In addition, heat generated in the fluid film and transferred to the foil 24 is relatively uniform from edge to edge as opposed to the situation where the clearance is greater at one edge than the other. Uniformity of heat generation in the foil 24 prevents localized heat distortion thereof which otherwise could cause the foil 24 to expand in the area of smallest clearance and become tapered or barrel-shaped which would then contact the shaft with consequent damage to the bearing 10.

While the preferred embodiment of the invention has been disclosed, it should be appreciated that the invention is susceptible of modification without departing from the scope of the following claims.

I claim:

1. A self-pressurizing compliant hydrodynamic gas bearing comprising
    a shaft journal,
    a plurality of spring elements secured to the inner periphery of said shaft journal,
    a plurality of arcuate pads on said spring elements, respectively, and
    a flexible foil disposed radially inwardly from said pads and positioned thereby, one end of said foil being secured to said shaft journal to preclude indexing thereof.

2. A gas bearing in accordance with claim 1 wherein said spring elements are of generally U-shaped cross section having a slot in a bight portion thereof for the acceptance of a tab on said shaft journal.

* * * * *